United States Patent [19]

Waterhouse et al.

[11] Patent Number: 5,569,527

[45] Date of Patent: Oct. 29, 1996

[54] ADHESIVE SYSTEM

[75] Inventors: Judith A. Waterhouse, Wilmington; Christopher J. Van Remoortel, Marblehead; Roy H. Caproni, Haverhill, all of Mass.

[73] Assignee: Bixby International Corporation, Newburyport, Mass.

[21] Appl. No.: 148,376

[22] Filed: Nov. 8, 1993

[51] Int. Cl.$^6$ ........................................................ C09J 7/02
[52] U.S. Cl. ........................... 428/261; 428/346; 428/350; 428/354; 428/355
[58] Field of Search .............................. 428/261, 343, 428/346, 350, 354, 355

[56] References Cited

U.S. PATENT DOCUMENTS

| | | | |
|---|---|---|---|
| 2,078,131 | 4/1937 | Ferguson | 428/346 |
| 3,849,240 | 11/1974 | Mikulak | 428/346 |
| 4,278,487 | 7/1981 | Hormanns | 428/346 |
| 4,621,019 | 11/1986 | Vikesland | 428/346 |
| 4,853,262 | 8/1989 | Horie | 428/346 |
| 4,942,082 | 7/1990 | Murphy | 428/346 |
| 5,094,912 | 3/1992 | Deibig | 428/343 |

OTHER PUBLICATIONS

Gustav Höpfner, "Environmentally Safe Sole Attaching Adhesives", American Shoemaking, vol. 368, No. 6, Jun. 1994.

"Adhesives & Fasteners New Products", American Shoemaking, vol. 368, No. 6, Jun. 1994.

Primary Examiner—Jenna L. Davis
Attorney, Agent, or Firm—Choate, Hall & Stewart

[57] ABSTRACT

Adhesive system for forming a resilient boxtoe structure. The system includes a coated substrate and a solution having a pH greater than 7.0 for activating the coating. Upon activation, the coating becomes tacky, enabling it to adhere to the upper and lining portions of the shoe to form a boxtoe. The coating is an acid copolymer which retains its modulus upon activation and assures a strong bond between the upper and lining of the shoe. It is preferred that the solution be an aqueous solution including additives such as ammonia to assure a pH exceeding 7.0.

12 Claims, 2 Drawing Sheets

ADHESIVE SYSTEM

BACKGROUND OF THE INVENTION

This invention relates to an adhesive system and more particularly to an adhesive system for bonding a plastic structural member to the upper and lining of a shoe to form a boxtoe, which is a stiffening component for footwear.

Boxtoes are formed in the toe portion of shoes and boots. The boxtoe structure may include a formable plastic member made of, for example, an alloy of an ionomer and a high impact polystyrene. This plastic member is coated with a material which, when activated, becomes tacky so that it may be adhered between an upper and a lining of the shoe.

Heretofore, the coating on the boxtoe component included styrene saturated products and thermoplastic ABS alloy which are activated by contact with solvents such as toluene, methylene chloride and methyl ethyl ketone. These solvents are highly volatile and pose a risk to the environment and to the personnel who must handle them in the shoe factory environment.

Another boxtoe adhesive system is known in which the adhesive coating is activated by immersion in hot water. This system thus requires the considerable energy expenditure necessary for heating water.

SUMMARY OF THE INVENTION

In one aspect, according to the invention, the adhesive system includes a stiffening and adhesive structure. This structure includes a substrate and a coating on at least one surface of the substrate. The coating becomes tacky upon contact with a solution having a pH greater than 7.0. In a preferred embodiment the substrate has a core flanked by layers of a non-woven fabric such as nylon or polyester. The core may be an alloy of an ionomer and high impact polystyrene. The coating is an acid copolymer. It is preferred that the activating solution be aqueous with additives which assure that the pH is greater than 7.0. Suitable additives include ammonia, isopropyl alcohol, and ethanolamine.

In another aspect the invention is an adhesive system including an activatable acid copolymer and a solution having a pH greater than 7.0. Upon exposure to the solution the acid copolymer becomes tacky.

Yet another aspect of the invention is a method for forming the boxtoe of a shoe. The method includes contacting an acid copolymer coated substrate with an aqueous solution whose pH exceeds 7.0. This contact activates the acid copolymer making it tacky. The now activated coated substrate is placed between an upper and a lining of the shoe. The upper and lining are urged together under heat and pressure to adhere the upper and lining to the substrate for forming the boxtoe shape in the lasting operation. It is preferred that the solution contact the coated substrate for at least three seconds to assure complete activation.

The aqueous activation solution of the invention obviates potentially harmful volatile solvents as used in the prior art. Further, hot water is not required thereby saving energy. The water activated acid copolymers do not lose stiffness as is often the case with prior art activation techniques.

DESCRIPTION OF THE PREFERRED EMBODIMENT

Figure 1:
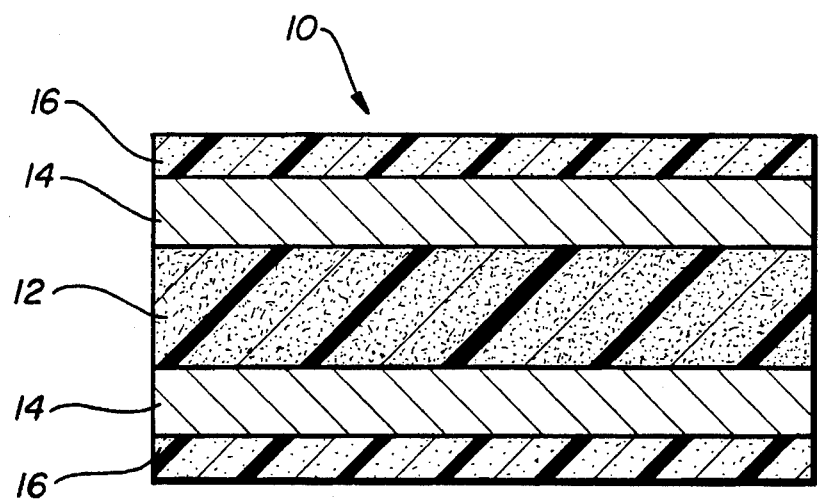
FIG. 1 is a cross-sectional view of the coated substrate of the invention.

With reference now to FIG. 1, a boxtoe adhesive and stiffening structure 10 includes a core 12 preferably having a thickness in the range of 0.010–0.080 inch. A suitable core 12 material is an alloy of an ionomer such as sodium salt ionomer available from Dupont under the designation 8940 and a high impact polystyrene such as Huntsman 730. Zinc and lithium salt ionomers may also be used. On each side of the core 12 is bonded a layer of a non-woven fabric 14 such as nylon or polyester. The process for bonding the non-woven fabric 14 to the core 12 will be discussed below. The fabric 14 provides both a reinforcement and a bonding surface for adhesive acid copolymer coatings 16 which are bonded to the fabric 14. A suitable coating 16 thickness is 0.004 inch.

A suitable acid copolymer 16 is 60/40 GL adhesive from Belland AG of Biberist, Switzerland. Another suitable product for specific factory handling is GBC 2580AA also from Belland. The 60/40 GL acid copolymer does not lose stiffness after activation as is often the case for other acid copolymers. This material is sensitive to and partially soluble in alkali solutions. Testing has established that with proper extrusion conditions its modulus is not degraded.

The general physical properties and processing conditions of the materials suitable for practicing the present invention are shown in Table 1.

TABLE 1

| General Physical Properties | |
| --- | --- |
| Density | 1.1 |
| Appearance | Transparent (not limiting, can be white or colors) |
| Acid number, mg KOH/gm polymer | Titration range 100–160 |
| Water absorption, Air, 24 hrs. % | 0.4% |
| Water, 24 hrs. % | 0.9% |
| Thermal Properties include DCS (tg) | 115° F. |
| Processing | |
| Melt Flow Index, 2160 g, g/10 min. 340° F. | 4–8 |
| Melt Temperature (Extrusion), °F. | 250–430 |

It is preferred that the melt flow index be 4 and that the melt temperature for extrusion be approximately 400° F. As stated above, this adhesive material is activated (becomes tacky) by contact with a solution having a pH above 7.0. Suitable solutions for activating the coating 16 include ammonia water solutions, isopropyl alcohol water solutions and ethanolamine water solutions. The degree of the tack is deemed in terms of both time and ability to adhere to a shoe upper and lining. It is preferred that the coating contact the activating solution for a time in the range of 3–25 seconds. After this contact the coating material will remain activated for approximately 2–3 minutes. Aqueous solutions containing no more than approximately 2% of ammonia, isopropyl alcohol, or ethanolamine will create a pH greater than the required 7.0 for activation.

The boxtoe material 10 is dipped into the activator solution for a time sufficient for tack to develop. The now tacky structure 10 is inserted between an upper and a lining of a shoe (not shown). Pressure and heat within a suitable mold assure that a good bond with the upper and lining is achieved. This lasting process is made easier because of molding characteristics of surlyn which is a component in the formulation. The firmness and resilience of the finished product is superior to prior art styrene saturated technology.

Figure 2:
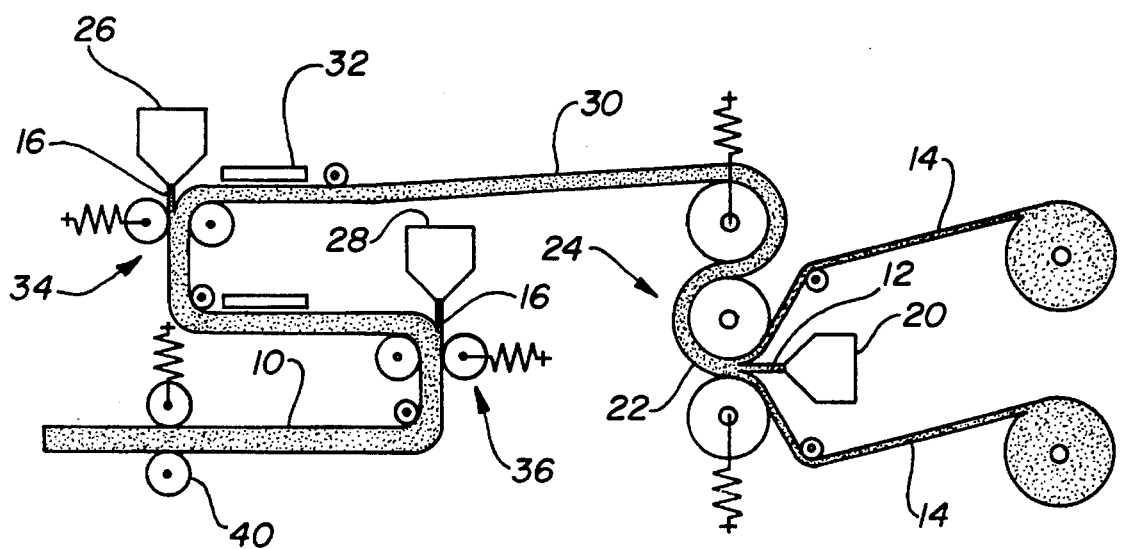
FIG. 2 is a schematic illustration of the process for making the coated substrate structure.

The apparatus and process steps for creating the multi-layer structure of FIG. 1 will now be described in detail in conjunction with FIG. 2. A primary die 20 extrudes the core material 12 which is an alloy of an ionomer and high impact polystyrene. The extruded core material 12 is sandwiched between the upper and lower non-woven fabric 14. The non-woven fabric 14 is laminated to the core 12 which is in a hot molten state in the primary nip 22 of a three roll stack generally designated at 24. As is clear from FIG. 2, the top fabric is fed over the top of the primary die 20 and is laminated to the top of the plastic core material 12. The bottom fabric is fed under the primary die and is laminated to the bottom of the plastic core 12. The three layer composite cools and solidifies on the rolls of the three roll stack assembly 24. The gauge uniformity of the extruded plastic, the melt temperature of the extrudate, and roll pressure are selected to ensure maximum bond strength of the fabrics 14 to the core material 12.

Figure 3:
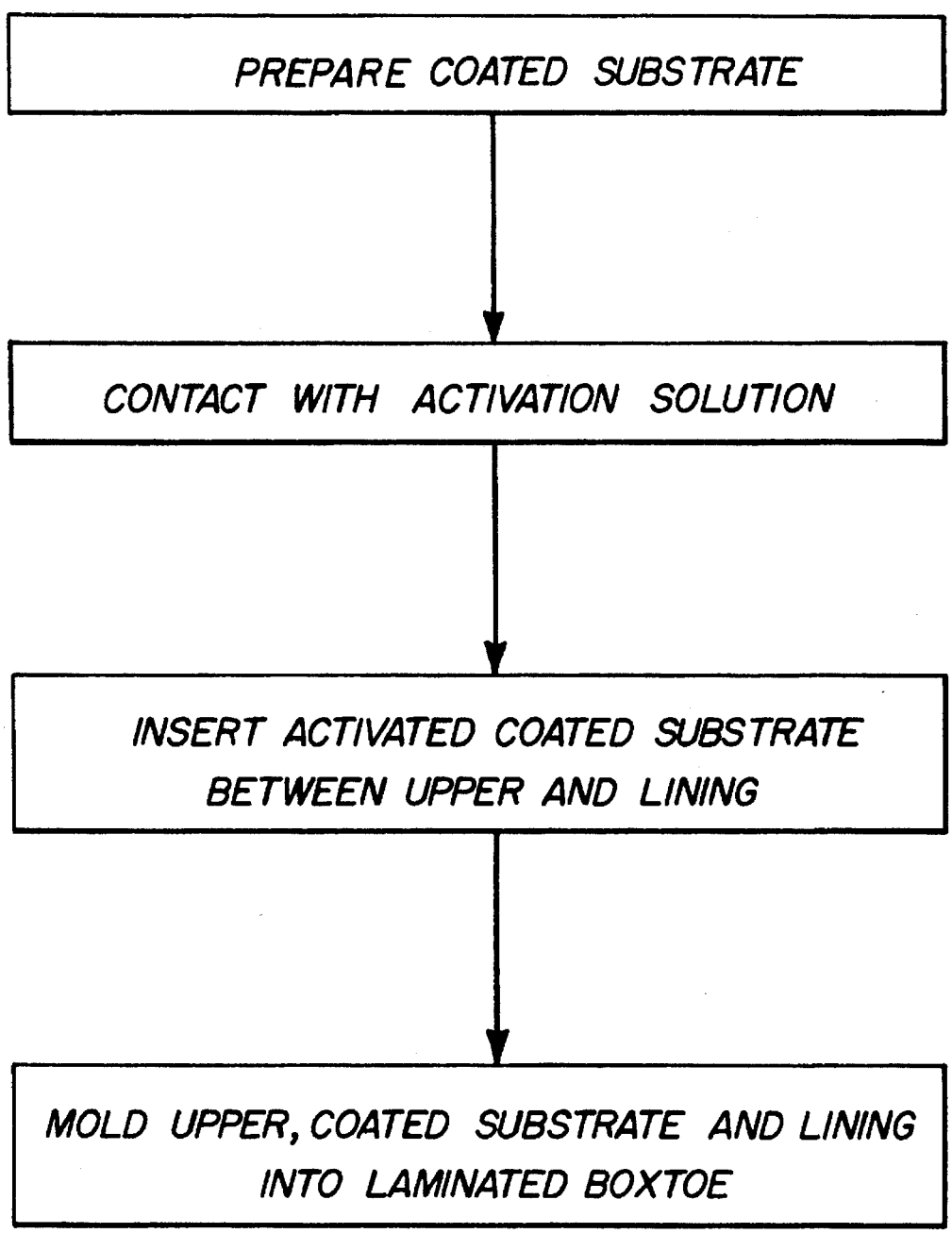
FIG. 3 is a block diagram illustrating the steps for making a laminated boxtoe.

The three layer material emerging from the three roll stack 24 is now fed continuously to coating apparatus for applying the adhesive layers 16. The adhesive coating 16 is extruded from a top coating die 26 and a bottom coating die 28. There are several key steps in the coating process to ensure a maximum bond of the coating 16 to the non-woven fabric 14. First, the three layer structure 30 emerging from the three roll stack 24 and the extrudate from the dies 26 and 28 must be hot during coating. Before reaching the top coating die 26, the top surface of the structure 30 is heated by a top pre-heater 32. The structure 30 then enters a top coating nip of the rolls 34 which change the direction of the layered structure 30 by ninety degrees from horizontal to vertical. The vertical orientation allows the hot extrudate from the top coating die 26 to fall precisely into the pinch point of the top coating nip of the rolls 34. This approach is such that the hot extrudate from the top coating die 26 does not contact the layered structure 30 or back up roll until it reaches the pinch point. This process allows the extrudate to stay hot and molten to ensure a maximum bond with the layered structure 30. It is important that the distance between the lip of the top coating die 26 and the pinch point of the rolls 34 be kept to a minimum so that the extrudate will not have a chance to cool. Further, a uniform high pressure at the pinch point in the nip of the rolls 34 is essential for a maximum bond across the web structure 30. High pressure at the pinch point is created by air cylinders (not shown) and the uniform pressures achieved by covering the meal back up roll with a softer material, such as silicone. The release characteristics of silicone prevent the extrudate from sticking to the roll. The bottom coating is applied in the same manner using the bottom coating die 28 and bottom coating nip provided by the rolls 36. The five layer structure 10 emerging from the rolls 36 proceed through a haul-off nip 40. The finished material, upon activation as discussed above, can be used for adhering, for example, the upper and lining portions of a shoe to form a toe box assembly. The steps of this process are illustrated in FIG. 3.

It is to be understood that other applications for the adhesive structure of the invention are contemplated. Because the adhesive structure of the invention is activated without the use of potentially toxic solvents, the system of the invention is advantageous over prior art systems.

What is claimed is:

1. Adhesive structure comprising:

a substrate having a core flanked by layers of a non-woven fabric, the core being an alloy of an ionomer and a high-impact polystyrene; and a coating on at least one surface of the substrate, the coating becoming tacky upon exposure to a solution of pH greater than 7.0.

2. The adhesive structure of claim 1 wherein the coating is an acid copolymer.

3. The adhesive structure of claim 1 wherein the solution is an aqueous solution.

4. The adhesive structure of claim 5 wherein the aqueous solution includes an additive selected from the group comprising ammonia, isopropyl alcohol and ethanolamine.

5. The adhesive structure of claim 1 wherein the non-woven fabric is nylon.

6. The adhesive structure of claim 1 wherein the substrate comprises a sodium salt ionomer.

7. The adhesive structure of claim 1 wherein the substrate comprises a zinc salt ionomer.

8. The adhesive structure of claim 1 wherein the substrate comprises a lithium salt ionomer.

9. The adhesive structure of claim 1 wherein the non-woven fabric is polyester.

10. The adhesive structure of claim 2 wherein the acid copolymer includes a component which is partially soluble in alkali.

11. Adhesive system comprising:

an activatable acid copolymer which forms a coating on a substrate, the substrate having a core flanked by layers of a non-woven fabric, the core being an alloy of an ionomer and a high-impact polystyrene; and a solution having a pH greater than 7.0, wherein the copolymer becomes tacky upon exposure to the solution.

12. The system of claim 1 wherein the solution is a water solution with additives to ensure a pH greater than 7.0.

* * * * *

UNITED STATES PATENT AND TRADEMARK OFFICE
CERTIFICATE OF CORRECTION

PATENT NO. : 5,569,527
DATED : October 29, 1996
INVENTOR(S) : Judith A. Waterhouse, et. al.

It is certified that error appears in the above-indentified patent and that said Letters Patent is hereby corrected as shown below:

Column 3, line 50: please delete "meal" and insert therefor -- metal --.

Signed and Sealed this

Eleventh Day of February, 1997

Attest:

BRUCE LEHMAN

Attesting Officer

Commissioner of Patents and Trademarks